United States Patent Office 3,414,383
Patented Dec. 3, 1968

3,414,383
DETERMINATION OF THYROXINE
Beverley E. P. Murphy, Montreal, Quebec, Canada, assignor to Canadian Patents and Development Limited, Ottawa, Ontario, Canada, a corporation of Canada
No Drawing. Filed Aug. 9, 1965, Ser. No. 478,432
15 Claims. (Cl. 23—230)

ABSTRACT OF THE DISCLOSURE

Measurement of thyroxine in solution by competitive binding to TBG, including precipitating proteins with a lower alkanol, equilibrating with barbital-buffered solution of TBG, and labeled thyroxine, removing unbound thyroxine with an anion exchanger and determining the labeled thyroxine released from, or remaining bound to the globulin by counting techniques.

---

This invention is concerned with the direct and specific assay of the hormone thyroxine in body fluids, particularly blood. An improved competitive protein-binding analysis using radio-chemical techniques has been developed. Improved techniques for initial extraction of the thyroxine, and particularly the final separation of protein-bound from unbound thyroxine, have now been found.

Thyroid-function tests in the past have included measurement of blood iodine or PBI (protein-bound-iodine which is a measurement of a particular fraction of blood iodine), and (T3) triiodothyronine-, or (T4) thyroxine-uptake tests, all of which are indirect indices of thyroxine level in the serum. The PBI is affected by non-thyroxine iodine and mercurial diuretics (common forms of contamination) while the uptake tests provide only crude estimations of the degree of protein-binding of thyroxine in the serum. More direct methods were the double isotopic dilution of Whitehead and Beale, Clin. Chim. Acta. 4:710, 1959 and the method of R. P. Ekins, Clin. Chim. Acta. 5:453, 1960, but these latter tests have been lengthy, difficult, expensive or cumbersome.

The present method utilizes the thyroxine-binding globulin (TBG) which strongly binds thyroxine in a highly specific manner and the dynamic competition between bound and unbound thyroxine for binding sites. Competition of other substances with thyroxine for binding sites is negligible. If a serum containing TBG is first saturated with radioisotope-labeled thyroxine and then unlabeled thyroxine added, an equilibrium will be set up between labeled and unlabeled thyroxine. The percent labeled thyroxine unbound or liberated from the TBG will be directly proportional to the amount of added unlabeled thyroxine. Unknown serum thyroxine can be assayed therefore by comparing (by counting techniques) the amount of labeled thyroxine liberated by the sample to the amount liberated by known amounts of thyroxine.

Briefly the method of the invention is as follows:

(a) Serum is treated with alcohol to separate the binding and non-binding proteins as precipitate, with the thyroxine remaining in solution. After removing the precipitate the solution is preferably evaporated to dryness. (The alcohol must be evaporated or diluted prior to adding the standard TBG since otherwise the standard TBG itself will be precipitated.)

(b) The isolated thyroxine fraction is then equilibrated with a serum solution containing a known (or experimentally determined optimum) amount of TBG saturated with radioactive-iodine-labeled thyroxine. The thyroxine (unknown) will displace some of the labeled thyroxine from the TBG.

(c) The unbound thyroxine is separated from the TBG-bound material by the use of an anion exchanger which combines with the unbound hormone but not with the TBG and bound thyroxine.

(d) The solution containing the bound labeled and unlabeled thyroxine is removed and analyzed for labeled thyroxine by counting (e.g. in a well-type scintillation counter). By comparing with controls starting with known amounts of thyroxine, the amount of thyroxine in the original serum can be determined.

One may determine either the protein-bound fraction or the unbound fraction routinely, but in the preliminary experiments it is necessary to determine both, and to compare them with a standard containing the total number of counts in order to be certain there are no losses unaccounted for. Once the recovery of radioactivity added is well established one fraction only may be counted routinely (the bound or unbound whichever is more convenient) and this count may then be related to that of a standard containing the total counts added to the samples.

The body fluid being treated is normally blood, but unknown amounts of thyroxine can be determined in any fluid. Blood serum, plasma or other forms of blood may be started with, but care should be taken that the blood is not more than mildly hemolyzed. Preliminary tests with urine have shown satisfactory results.

Destruction of the binding ability of the binding proteins in test sample must be achieved in order to free all the thyroxine for assay of total thyroxine present. The alcohol precipitation step to remove proteins and other alcohol-insoluble material and free the thyroxine may be carried out by adding a lower alkanol (about 1.5 to 3:1 v./v. alcohol:serum), shaking, centrifuging and removing the supernatant containing the thyroxine. An aliquot is taken and evaporated to dryness (or the alcohol removed or diluted).

Recently it has been found that a mixture of ethanol and n-butanol (preferably equal parts) give higher recoveries of thyroxine than ethanol. Also acetone-ethanol 1:1 gives higher recoveries but is harder to work with than ethanol.

The recovered thyroxine is added to a dilute standard plasma or TBG solution containing TBG saturated with labeled thyroxine (described below). The labeled thyroxine may contain $I^{131}$ or $I^{125}$ (or theoretically any radioactive isotope of iodine, nitrogen or carbon). If from plasma the standard solution should be diluted to less than 2.5 mg. of albumin per ml. in order to minimize albumin binding of the thyroxine and should also be buffered with barbital i.e. diethyl barbituric acid to inhibit prealbumin binding of the thyroxine. A pH of 7.2 to 8.8 is preferred but much wider limits (e.g. 6.5–9.5) apply.

The standard TBG solution may be desirably prepared by diluting normal plasma about 30 to 50 times and adding labeled thyroxine in an amount of 5 to 25 microcuries per litre of solution. The endogenous thyroxine normally just saturates the TBG present and the weight of the added tracer is negligible so that its exact amount is not critical.

Equilibration of the unknown thyroxine sample with this standard solution is substantially complete within about 1 to 2 minutes at room temperature, although 10 minutes equilibration at slightly elevated temperature (30 to 50° C.) is recommended to ensure solution of the dried thyroxine.

The equilibrated solution is then treated to separate the protein-bound and unbound thyroxine by means of an anion exchanger. It has now been found that unbound thyroxine is substantially completely insolubilized or removed from this system by a strong base organic anion exchanger. Any anion exchanger having strongly basic amino or quaternary ammonium groups would be suitable. The resins should have a porosity allowing the thyroxine molecule to penetrate the matrix. Resins found to be effective include Rexyn 202 [alkanol quaternary amine ($R_4 N^+$) groups on a medium porosity polystyrene base] which has the following characteristics:

Total exchange capacity (wet vol.) meg./ml.
  min__ 0.95
Total exchange capacity (dry basis) meq./mg.
  min__ 3.3
Mesh size (wet, U.S. standard sieve) _____ 16–50
Active working density (dry basis) gm./l.
  min__ 340
Moisture content _____percent__ 45–55
Ionic form, chloride-sulfate.

Another resin which has been used is Dowex 1-X8 (a strongly basic quaternary ammonium anion exchanger having a crosslinked polystyrene base). The characteristics are given as:

Total exchange capacity (wet vol.) meq./ml. __ 1.4
Total exchange capacity (dry basis) meq./mg. __ 3.2
Moisture content, percent _____ 40.2
Mesh size, 200–400 spheres.
Ionic form—chloride.

Before use this resin was usually ground to a powder and dried. In this form the resin does not readily fall to the bottom after shaking, and it is necessary to remove the resin from all samples together e.g. by filtering or centrifuging.

The amount of resin added is not critical, but should be sufficient to bind the free thyroxine. About 50–70 mg. (or about 50% by vol. of Rexyn 202) is normally added per ml. of the equilibrated solution. The action of the resin on the solution should be limited to prevent active resin taking up some of the thyroxine which was originally bound to the TBG. Insufficient contact of resin and solution will prevent all unbound thyroxine becoming attached to the resin. Usually the duration of shaking is adjusted to effect this control (about one to three minutes shaking has been found suitable depending on how vigorous the shaking and on the resin). To avoid errors due to differences in resin batches, temperature, or shaking it is recommended that a blank and at least one standard be run with each group of determinations.

The resin and solution can be separated by decantation, centrifugation or filtration. Alternatively the resin can be enclosed in a porous sack (or "tea-bag") and the sack removed after shaking. Pieces of sponge impregnated with the resin (e.g. as in British Patent No. 963,594) can also be used. The clear solution is then counted (or the resin may be washed and counted) to determine the percent bound or unbound labeled thyroxine.

Varying known amounts of unlabeled thyroxine are added and a standard curve established. The optimal amounts of thyroxine-I* and TBG are determined by the desired range of the standard curve and the specific activity of the isotope. The standard curve is reproducible provided the same plasma or TBG is always used and all other conditions including temperature are exactly reproduced. This TBG (or plasma) solution is termed the standard TBG (or plasma) solution. A large stock solution of this TBG can be made and the appropriate amount of thyroxine-I* added to it as required.

The mean percent bound I*-thyroxine from the various standard values can be plotted vs. m$\mu$g. thyroxine to give a standard curve for comparison of unknowns. Alternatively, the mean time required for 10,000 counts (from standards) may be plotted vs. m$\mu$g. thyroxine to give an approximately straight line over the usable range. The amounts of thyroxine in the serum samples read from the curve or line in m$\mu$g. correspond to the amount in 100 ml. of serum expressed in $\mu$g. When desired the thyroxine iodine may be calculated as 65.3% of this value (since iodine is 65.3 wt. percent of the thyroxine molecule).

A source of error is due to incomplete extraction or separation of all the thyroxine into the alcohol. By starting with a known amount of radioactive thyroxine, adding plasma and alcohol, removing a sample of the supernatant and counting—the percent recovery for this step can be checked. If the recovery is less than about 75% the alcohol separation step should be repeated or extended to assure recoveries of 75–80% using ethanol alone, or 80–90% using an ethanol-butanol mixture. Recovery of unlabeled thyroxine added to plasma-alcohol supernatant and carried through the remainder of the procedure should approximate 100%.

The temperature of the determination procedure (except the extraction and equilibration steps) should be kept low, desirably about 5–15° C. The stock solutions and thyroxine solutions are kept refrigerated. Studies have shown that the sensitivity of the method tends to decrease with increasing temperature above about 15° C. (because the binding is decreased).

Results obtained using thyroxine-$I^{125}$ were similar to those using thyroxine-$I^{131}$. Because of the longer half life (60 days) thyroxine-$I^{125}$ was found to be more convenient to use. Since the specific activity of labeled thyroxine is relatively high the exact amount of the isotopic form added was not important and could be adjusted to give suitably rapid counting.

Occasionally, depending on the particular batch of pooled serum used in making up the isotope-TBG solution, the standard curve appears sigmoidal. This phenomenon is readily noticeable if serum from hypothyroid patients is used. It occurs when the TBG in these sera is unsaturated (with thyroxine) under the conditions used and this will introduce a small error in the low values (0–5 m$\mu$g.). This unsaturation is readily corrected by adding a small amount of unlabeled thryoxine, the amount of which can be estimated from the hypothetical curve.

This resin precipitation process has been found, in controlled comparisons, to give results of equal or better accuracy than previous methods for determining thyroxine or thyroxine iodine. This process is also simpler, more economical and more readily carried out routinely on large numbers of samples. The resin precipitation step is simpler and faster than the gel filtration in columns as previously used by applicant. A large number of determinations using ethanol extraction (uncorrected for recovery) and the resin precipitation technique, after checks for accuracy and correlation with clinical data, have shown the normal thyroxine range to be 4.0 to 11.0 $\mu$g. per 100 ml. corresponding to thyroxine iodine 2.6 to 7.2 $\mu$g. per 100 ml.

The following examples illustrate the invention. The following solutions were used in the examples:

Solution A.—Aqueous solution of barbital buffer at pH 8.6 and ionic strength 0.75. Kept refrigerated.

Solution B.—Standard thyroxine solution. Sodium L-thyroxine pentahydrate (available as Eltroxin in 100 $\mu$g. tables). Ten tables were crushed, added to 2 ml. of 0.1 N NaOH, diluted to 200 ml. with 70% ethanol and thoroughly shaken. From the resulting suspension 2.28 ml. were diluted with 70–95% ethanol to a volume of 100 ml. giving 0.1 $\mu$g./ml. thyroxine. Kept refrigerated in a freezer.

Solution C.—Labeled thyroxine solution. Radioactive thyroxine-I*, 5 $\mu$c. in 1 ml. of 50% propylene glycol solution was added to 15 ml. of pooled serum, 5 ml. of 1% phenol, 5 ml. of propylene glycol, and finally Buffer Solution A added to 500 ml., mixed, and kept refrigerated.

Resin.—Anion exchange resin, Rexyn 202 (except where noted) analytical grade medium porosity (in chloride-sulphate form) was soaked (except where noted) overnight in Buffer Solution A and rinsed with Buffer solution until the rinse pH was above 8.0. The supernatant was discarded and the resin dried at 95° C. Resin dispensed in 0.5 ml. quantities.

Example 1

Two ml. of 95% ethanol (70% ethanol is also satisfactory) were added to 1.0 ml. of each patient's blood serum in a small test tube and lightly stirred (with a wire). Shaking gave a coarser precipitate with a slightly lower recovery of thyroxine). The tubes were stoppered and centrifuged at 2000 r.p.m. for 4 minutes.

Of each supernatant 0.3 ml. was transferred to each of 2 small test tubes and evaporated to dryness in a 45° C. water bath with a gentle stream of air.

To serve as standards 0, 0.05, 0.10, 0.20 and 0.30 ml. of solution of L-thyroxine 0.1 $\mu$g./ml. in 70% ethanol (solution kept refrigerated to $-10°$ C. but allowed to warm up before pipetting), were pipetted in triplicate into similar small test tubes and evaporated to dryness.

To each dried test tube, and to each of 3 counting cuvettes, 1.00 ml. of Solution C was added. The tubes were shaken gently and placed in a 45° C. water bath for 8 minutes, then shaken again to dissolve the dry residue. The tubes were then placed in a tray of cold water (10° C.) for 10 minutes (or longer).

After cooling below 15° C., about 0.5 cc. of the anion exchange resin was immediately added to each tube. The tubes were shaken (while standing in a rack) with a horizontal motion for one minute, and then replaced in the cooling water.

Buffer Solution A, 3.0 ml. at 5° C., was added to each tube and mixed by shaking for a few seconds. The resin settled rapidly and 2.0 ml. aliquots of clear supernatant were pipetted directly into counting cuvettes and counted to 10,000. A well-type scintillation detector with a variable discriminator was used, with the bias set at the minimum value.

The net counts per second in each cuvette multiplied by 2 to correct for volume taken, divided by the activity in 1.00 ml. of standard isotope-TBG solution, gave the percent bound thyroxine. It is easier to plot time per 1000 counts versus m$\mu$g. thyroxine which gives approximately a straight line.

TABLE 1

| Sample No. | Percent bound thyroxine | Time in sec. per 10,000 counts | Thyroxine in sample, m$\mu$g. | Mean |
|---|---|---|---|---|
| 1 | 69.4 | 83.3 | 5.0 | 5.1 |
|   | 69.4 | 83.4 | 5.0 |     |
|   | 68.5 | 84.5 | 5.2 |     |
| 2 | 64.2 | 90.2 | 6.2 | 6.7 |
|   | 61.5 | 94.2 | 7.1 |     |
|   | 62.6 | 92.4 | 6.7 |     |
| 3 | 59.0 | 98.0 | 7.8 | 7.9 |
|   | 58.8 | 98.4 | 7.9 |     |
|   | 58.1 | 99.5 | 8.0 |     |

Unknown thyroxine values were readily obtained from a standard curve or line based on these data. These values were in close agreement with control assays of protein-bound iodine PBI, thyroxine or thyroxine-iodine using other methods, and also correlated well with the clinical condition of the patients.

The analogs triiodothyronine and diiodothyronine, diphenyl hydantoin and X-ray contrast media, even if present in significant amounts, do not interfere with the determation.

Example 2

The procedure of Ex. 1 was followed except a mixture of equal parts by volume of 95% ethanol and n-butanol was used (instead of ethanol) for the initial thyroxine extraction from blood serum. An improved recovery of total thyroxine was obtained (90% compared to 75-80% for ethanol alone).

Example 3

The general procedure of Ex. 1 was followed except that the Dowex 1–X8 resin described above in the chloride form was used instead of the Rexyn 202. The spheres were air dried and ground to powder (200–400 mesh) and without treating with Buffer Solution A, 60 mg. was added to each tube containing the sample solution equilibrated with Solution C. After shaking and adding Buffer Solution A as in Ex. 1, the resin was filtered from all tubes simultaneously and the resin counted to 10,000. The results were in agreement with those of Ex. 1.

Example 4

The resin was enclosed in small bags of paper (the type used in surgical masks, which resembles lens paper, is thin, tough and easy to work with) in amounts of 0.5 cc. The shaking (after adding the bagged resin to each tube) was increased to 3 min. to compensate for the extra barrier. After shaking, the bags were allowed to drain for a few seconds, then were transferred to 50 ml. test tubes containing 10 ml. of water. These test tubes were shaken to wash out excess thyroxine solution and the bags were removed and counted. Also one ml. of the solution remaining after draining the bags was counted. Four runs were made and the results were in agreement with Ex. 1.

Example 5

This example illustrates, a further method of separating the resin. The resin and procedure of Ex. 1 was used. After shaking the tubes containing the resin, about 10 ml. of water was quickly added to each tube (to dilute and stop the thyroxine-resin reaction). The bulk of the supernatant was removed (by suction) and another 10 ml. of water added to wash the loose resin. Again the most of the supernatant was removed and the tube containing the resin was counted. The results were in agreement with Ex. 1.

The solutions and materials required for the determination can be readily assembled in kit or package form. Solutions A and C (and optionally the alcohol and standard thyroxine solutions) can be packaged in unit quantities, together with the required amount of the anion exchange resin. The resin may be encapsulated or pressed into pellet form of the required size, to simplify handling and measurement. Enclosing the resin in "tea-bag"-like sacks has been found convenient. Other porous containers or sponge matrices may be used to contain the resin.

I claim:
1. A method for measuring thyroxine in solution by competitive protein binding comprising:
   (a) precipitating proteins from solution with a lower alkanol leaving substantially all of the thyroxine in solution,
   (b) equilibrating a solution of this free thyroxine with a dilute solution containing thyroxine-binding globulin (TBG), radioisotope-labeled-thyroxine and barbital,
   (c) separating the unbound thyroxine by removal thereof with a strong base anion exchanger, the contact of the solution with the anion exchanger being limited to prevent reaction with bound thyroxine, and,
   (d) counting (with a scintillation counter) one of (1) the labeled thyroxine released from the TBG, and (2) the labeled thyroxine remaining bound to the globulin, the labeled thyroxine (counts) being directly proportional to the thyroxine present in the original solution.

2. The method of claim 1 wherein the time of contact of the thyroxine-containing solution and the exchanger is limited, as determined by control test, to prevent removal of bound thyroxine from the globulin by the exchanger.

3. The method of claim 1 wherein the temperature of the thyroxine solutions is below about 15° C.

4. The method of claim 1 wherein the TBG solution is from plasma and in step (b) is diluted to less than 2.5 mg. alubumin per ml., and is buffered with barbital.

5. The method of claim 1 wherein the alkanol in step (a) is ethanol.

6. The method of claim 1 wherein the alkanol in step (a) is a mixture of ethanol and n-butanol.

7. The method of claim 1 wherein the amount of exchanger added is about 50–70 mg./ml.

8. The method of claim 1 wherein the anion exchanger is removed from the solution and the exchanger counted.

9. The method of claim 1 wherein the anion exchanger is removed from the solution and the solution counted.

10. The method of claim 1 wherein the anion exchanger contains quaternary ammonium groups.

11. The method of claim 1 wherein the anion exchanger is a polystyrene-base resin having attached quaternary ammonium groups.

12. The method of claim 1 wherein the anion exchanger is a resin enclosed in a porous container.

13. A packaged test kit for measuring thyroxine in solution by competitive binding comprising the combination of (a) barbital buffer solution sufficient to provide a pH of 6.5–9.5 in use, (b) radioisotope-labeled thyroxine solution and (c) a strong base anion exchanger in packaged units of about 50–70 mg.

14. The kit of claim 13 including one of (d) stable thyroxine solution and (e) stable thyroxine-plus-TBG solution, both solutions being of standardized concentration.

15. The kit of claim 13 wherein the thyroxine solution (b) contains a known or constant amount of TBG.

References Cited

UNITED STATES PATENTS 3,206,602  9/1965  Eberle _____ 250—71.5

OTHER REFERENCES

Mitchell: "Resin Uptake of Radiothyroxine in Sera from Non-Pregnant and Pregnant Women," Journal of Clinical Endocrinology and Metabolism, vol. 18, pp. 1437–1439 (1958).

Mitchell: "The In Vitro Resin Sponge Uptake of Triiodothyronine-$I^{131}$ From Serum in Thyroid Disease and in Pregnancy," J. of Clin. Endo. & Metab., vol. 20 pp. 1474–1483 (1960).

Visscher: "$T_3$-$I^{131}$ Binding Capacity of Serum Proteins," Am. J. Obst. & Gynec 86:829–34, July 1963.

Man: "Butanol-Extractable Iodine of Serum," Dept. of Internal Med., pp. 531–538. (1951).

MORRIS O. WOLK, *Primary Examiner.*

R. E. SERWIN, *Assistant Examiner.*